United States Patent [19]
Lahti

[11] 3,777,235
[45] Dec. 4, 1973

[54] VARIABLE DC MOTOR POWER SOURCE

[75] Inventor: Abbott W. Lahti, Cambridge, Mass.

[73] Assignee: Power Systems, Inc., Cambridge, Mass.

[22] Filed: July 19, 1971

[21] Appl. No.: 163,613

[52] U.S. Cl.............. 318/341, 318/432, 318/434, 323/9, 332/59
[51] Int. Cl. ............................................. H02p 5/34
[58] Field of Search .................. 332/59; 323/9, 4, 323/22 T; 318/331, 341, 332, 434, 432

[56] References Cited
UNITED STATES PATENTS
| | | | |
|---|---|---|---|
| 3,260,912 | 7/1966 | Gregory | 318/341 |
| 3,466,523 | 9/1969 | Brook | 318/332 |
| 3,089,992 | 5/1963 | Seney | 318/341 |

*Primary Examiner*—G. R. Simmons
*Attorney*—Gerald Altman et al.

[57] ABSTRACT

Precise control of fractional horse power DC motors is provided by a DC power source having a negative feedback amplifier, the signal at the output of the amplifier being controlled by a voltage derived from a potentiometer. A pulsed voltage having a peak amplitude somewhat less than the dead band voltage threshold of the amplifier is applied to an input terminal of the amplifier for low speed control of the motor. Peak current limiting with a load compensator operates to reduce the output voltage of the power source after a short circuit is removed.

13 Claims, 15 Drawing Figures

INVENTOR.
ABBOTT W. LAHTI
BY
Morse, Altman & Oates
ATTORNEYS

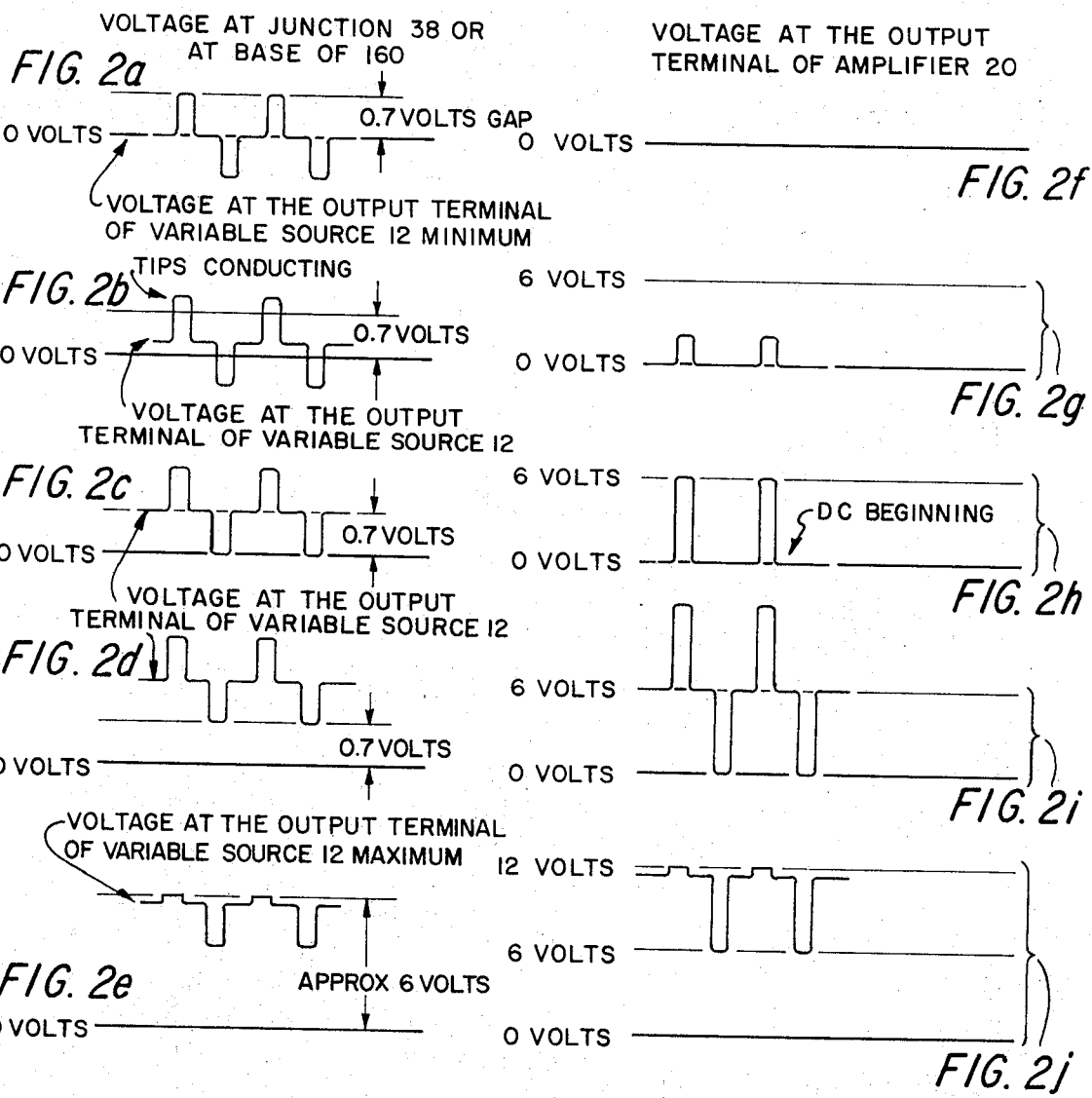

INVENTOR.
ABBOTT W. LAHTI
BY
Morse, Altman & Oates
ATTORNEYS

VARIABLE DC MOTOR POWER SOURCE

BACKGROUND OF THE INVENTION

1. Field of Invention

The present invention relates to power sources and, more particularly, is directed towards variable power sources for fractional horse power DC motors.

2. Description of the Prior Art

Several manufacturers have designed and developed various power sources for control of fractional horse power DC motors used in model railroad engines and miniature automobiles. Generally, these sources use a rheostat or an autotransformer for varying the voltage applied to the armature of the motor. Due to the rather substantial brush and bearing friction of fractional horse power motors, such power sources have suffered from the disadvantage of limited control of low speed operation.

SUMMARY OF THE INVENTION

An object of the present invention is to provide a DC power source which does not suffer from the aforemention disadvantages. The power source generates starting pulses which are superimposed on a DC control voltage for low speed operation and generates full wave rectified DC for rated speed operation of the motor. The control voltage, derived from a potentiometer, governs the output voltage of the power supply by controlling the signal at the output of a negative feedback amplifier. The pulsed signals, differentiated half wave rectified AC, are superimposed on the DC control voltage which is applied to an input terminal of the amplifier. The peak amplitude of the pulsed voltage as at the input terminal of the amplifier is somewhat less than the dead band voltage threshold of the amplifier. The pulsed DC voltage enhances low speed operation of the motor in overcoming the rather substantial brush and bearing friction. When the potentiometer is adjusted for full output power from the source, the pulses are effectively clipped and the voltage applied to the motor is full wave rectified DC. The power supply also includes peak current limiting with a load compensator which causes the output voltage of the source to be reduced after a short circuit condition is removed.

The invention accordingly comprises the power source possessing the construction, combination of elements, and arrangement of parts that are exemplified in the following detailed disclosure, the scope of which will be indicated in the appended claims.

BRIEF DESCRIPTION OF THE DRAWINGS

For a fuller understanding of the nature and objects of the present invention, reference should be made to the following detailed description taken in connection with the accompanying drawings wherein:

FIGS. 2(a) through 2(j) are a series of voltage waveforms illustrating certain principles of the invention;

DETAILED DESCRIPTION OF THE INVENTION

Figure 1:
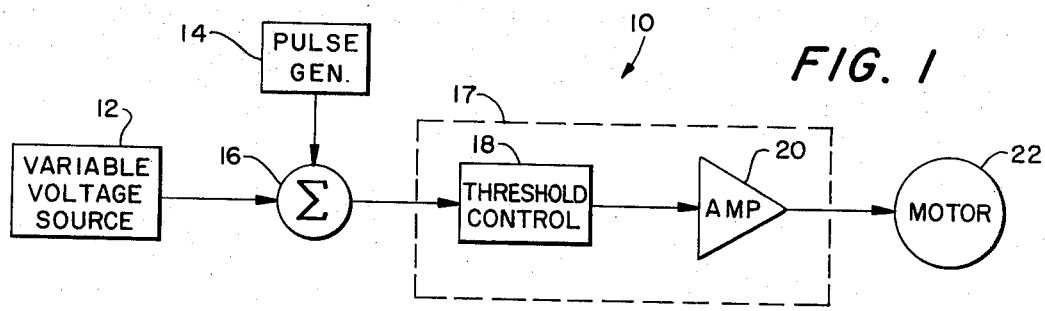
FIG. 1 is a block diagram of a DC motor power source embodying the invention.

Referring now to the drawings, particularly FIG. 1, it will be seen that a DC motor power source 10 embodying the present invention comprises a variable voltage source 12, a pulse generator 14, a summing network 16, and a driver 17. Driver 17 includes a threshold control 18, and an amplifier 20. The voltage from variable source 12 and the voltage pulses from generator 14 are summed in network 16. The pulsed signal at the output terminal of summing network 16 is fed to the input terminal of amplifier 20 via threshold control 18. The signal as at the output of amplifier 20 is applied to a DC motor 22. When the voltage at the output of source 12 is at a minimum level, for example zero volts, the pulsed signal at the input terminal of amplifier 20 is such that amplifier 20 is in a non-conducting state. That is, threshold control 18 operates to drop the pulsed voltage at the output terminal of summing network 16 to a level below that required to turn-on amplifier 20. As the voltage at the output of source 12 increases, the pulsed voltage at the input of amplifier 20 is such that a pulsed voltage is applied to motor 22 for starting. In other words, the pulse tips of the pulsed voltage at the input terminal of amplifier 20 energizes amplifier 20 into a conduction state. When the voltage as at the output terminal of variable source 12 is at a maximum level, for example 6 volts, the pulses from generator 14 are effectively clipped. In other words, the voltage at the output terminal of variable source 12 is sufficiently large to maintain amplifier 20 in a conducting state. The voltage waveforms at the input terminal of gap control 18 and the output terminal of amplifier 20 for successively increasing voltage levels at the output of variable source 12 are illustrated in FIGS. 2(a) through 2(j). The output voltage waveforms shown in FIGS. 2(f), 2(g), 2(h), 2(i) and 2(j) correspond to the input voltage waveforms shown in FIGS. 2(a), 2(b), 2(c), 2(d) and 2(e), respectively.

Figure 3:
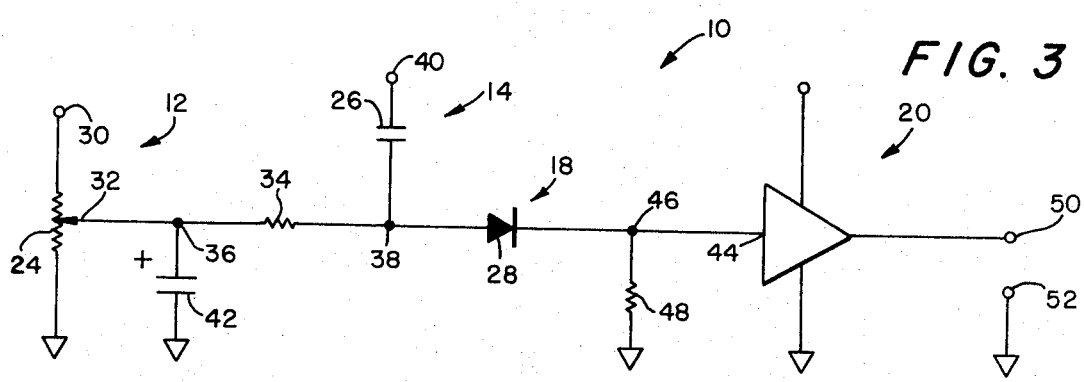
FIG. 3 is a schematic diagram of a DC motor power source embodying the invention.

Referring now to FIG. 3, it will be seen that in one embodiment of the invention, by way of example, variable source 12 is a potentiometer 24, pulse generator 14 is a capacitor 26, and threshold control 18 is a diode 28. Potentiometer 24 is connected serial between ground and a terminal 30 to which a voltage, for example full wave rectified AC, is applied. A wiper arm 32 of potentiometer 24 is connected to the anode of diode 28 through a resistor 34, the junction of resistor 34 and wiper arm 32 and the junction of resistor 34 and diode 28 being designated as reference characters 36 and 38, respectively. Capacitor 26 is connected serially between junction 36 and a terminal 40 to which a voltage, for example half wave rectified AC, is applied. Pulses are generated by feeding the half wave rectified AC through capacitor 36 to resistor 34. A capacitor 42 is connected serially between junction 36 and ground, capacitor 42 operating as a low impedance AC ground for resistor 34 to ensure that differentiation and attenuation take place and pulses are formed. The cathode of diode 28 is connected to an input terminal 44 of amplifier 20, the junction of diode 28 and amplifier 20 being designated as reference character 46. A resistor 48 is connected serially between junction 46 and ground, resistor 48 operating as a high impedance to ground. In an alternative embodiment, resistor 48 is connected in parallel with diode 28.

In operation of the power source shown in FIG. 3, by way of example the pulsed voltage at junction 38, when wiper arm 32 is at the ground end of potentiometer 24, is 0.7 volts. Diode 28 operates as a 0.7 volt diode threshold. That is, the voltage drop across diode 28 is the gap voltage of the semiconductor junction or the dead band voltage of the semiconductor junction. Therefore, at this setting of potentiometer 24, amplifier 20 is in a non-conducting state FIGS. 2(a) and 2(f). As wiper arm 32 is moved away from the grounded end of potentiometer 24, a pulsed voltage appears at input terminal 44 and amplifier 20 conducts. A pulsed voltage, the amplitude of which is governed by the gain of amplifier 20, appears between an output terminal 50 of amplifier 20 and a terminal 52 which is connected to ground. It will be realized that terminals 50 and 52 are the output terminals of the power source. As wiper arm 32 is moved away from the ground side of potentiometer 24, the pulses are superimposed on a control voltage derived from potentiometer 24. That is, the control voltage and the pulses are summed at junction 38. As shown in FIGS. 2(b) and 2(g), the tips of the pulses exceed 0.7 volts and a pulsed output signal is presented at output terminals 50 and 52. FIGS. 2(c), 2(h) and 2(d), 2(i) illustrate the voltage waveforms resulting from successive movements of wiper arm 32 away from the ground wide of potentiometer 24. When the control voltage is at a maximum level, the pulse tips are effectively clipped as shown in FIG. 2(e) and 2(j).

Figure 4:
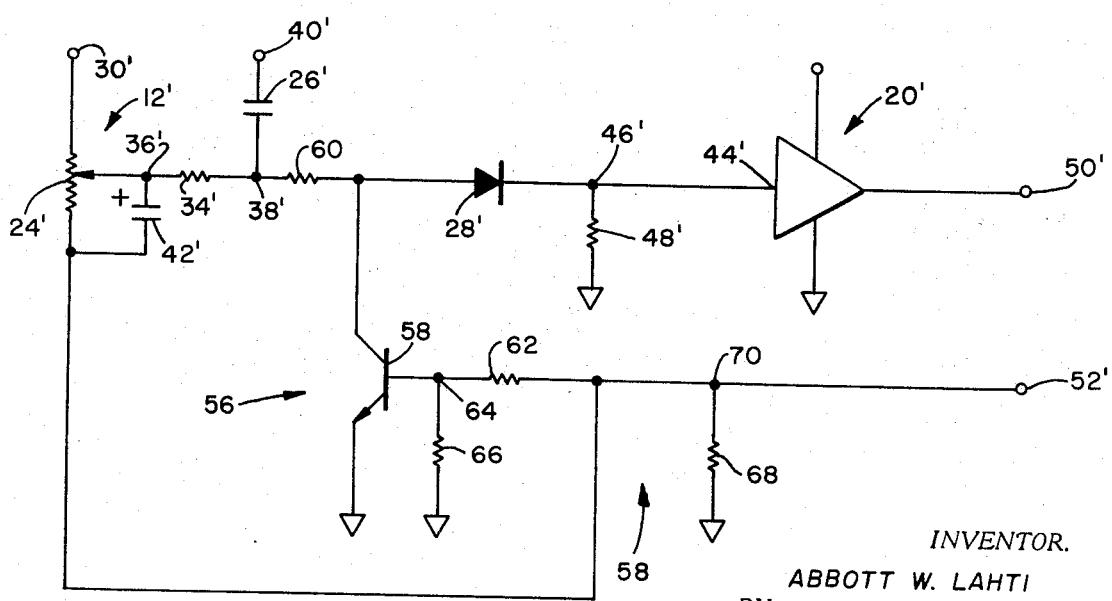
FIG. 4 is a schematic diagram of the DC motor power source of FIG. 3 including current limiting and load compensating networks.

Referring now to FIG. 4, there is shown an alternative embodiment of power source 10 in the form of a power source 54 which includes current limiting network 56 and a load compensation network 58. For convenience, common components of power source 10 and power source 54 will be designated by like reference characters and will be distinguished by primed notations. Current limiting network 56 includes a semiconductor 58, for example a NPN transistor. The collector of transistor 58 is connected to the anode of diode 28' which is further connected to junction 38' through a resistor 60. The emitter of transistor is connected to ground. The base of transistor 58 is connected to terminal 52' through a resistor 62, reference character 64 denoting the junction of resistor 62 and the base of transistor 58. A resistor 66 is connected serially between junction 64 and ground. A resistor 68 is connected serially between a junction 70 of resistor 62 and terminal 52', and ground. Load compensation is provided by connecting junction 70 to potentiometer 24' and capacitor 42'. That is, in power source 10, one side each of potentiometer 24 and capacitor 42 is connected to ground. Load compensation, i.e., positive current feedback, is provided by connecting potentiometer 24' and capacitor 42'. Output current sensed via resistor 68 is applied to amplifier in such a way as to provide load compensation. As hereinafter described in connection with the detailed schematic of FIG. 5, load compensation with peak current limiting operates to reduce the voltage at the output of terminals the power source after a short circuit is removed.

Figure 5:
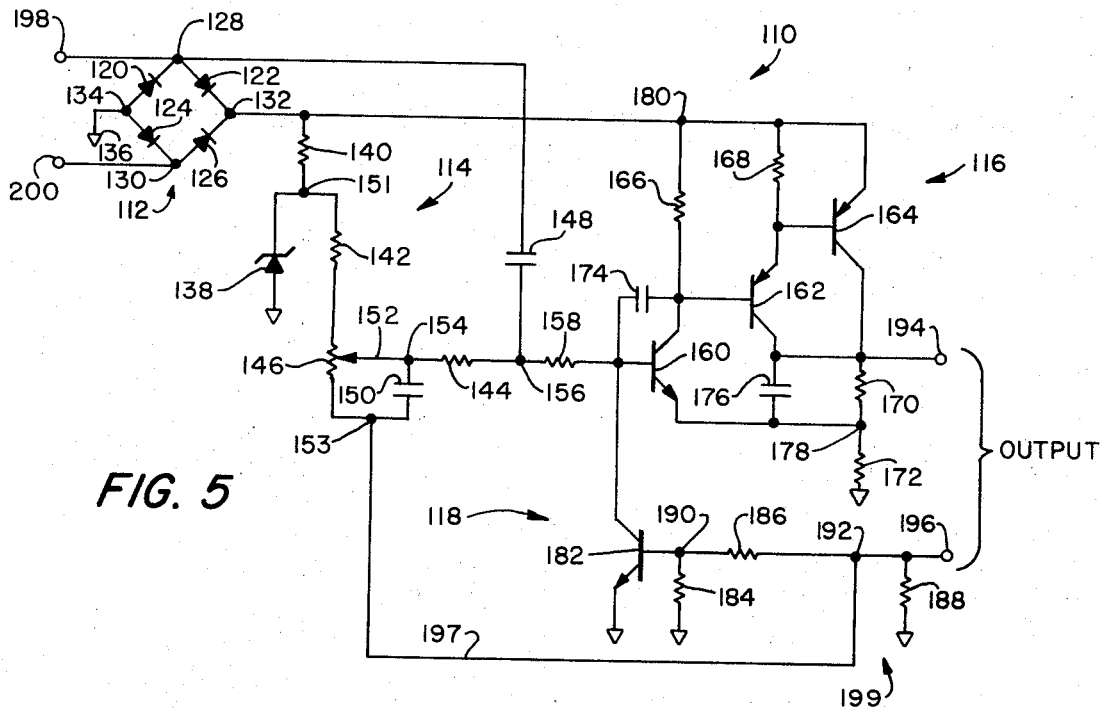
FIG. 5 is a detailed schematic diagram of an alternative embodiment of FIG. 4.

Referring now to FIG. 5, there is shown a detailed schematic of a power source 110 which is alternate embodiment of power source 54 having current limiting and load compensation. Power source 110 comprises a rectifying network 112, a voltage controller 114, a negative feedback amplifier 116, and a current limiter 118. Rectifying network 112, for example a full wave rectifier, includes diodes 120, 122, 124, and 126. The cathode of diode 120 and the anode of diode 122 are joined at a junction 128. The cathode of diode 124 and the anode of diode 126 are connected together at a junction 130. The cathode of diodes 122, and 126 are joined at a junction 132 and the anode of diodes 120 and 124 are connected together at a junction 134. An AC voltage is applied between junctions 128 and 130, junction 134 is connected to a ground 136, and junction 132 is connected to control network 114.

Control network 14 comprises a voltage regulator 138; resistors 140, 142, and 144; a voltage controller 146; and capacitors 148 and 150. By way of example, in the illustrated embodiment, voltage regulator 138 is a zener diode and voltage controller 146 is a variable impedance. The cathode of diode 138 is connected to junction 132 and one side of resistor 142 are connected at a junction 151 which is further connected to junction 132 through resistor 140. The anode of diode 138 is connected to ground. One side of variable impedance 146, for example a potentiometer, is connected to the other side of resistor 142, and the other side of potentiometer is connected to a junction 153. A wiper arm 152 of potentiometer 146 is connected to one side of capacitor 150 at a junction 54, the other side of capacitor 150 being connected to junction 153. Capacitor 148 is serially connected between junction 128 and a junction 156 which is further connected to junction 154 through resistor 144. Junction 132 is directly connected to amplifier network 116 and junction 156 is resistively connected to amplifier network 116.

Amplifier network 116 comprises transistors 160, 162, and 164; resistors 166, 168, 170, and 172; and capacitors 174 and 176. The base of transistor 160, for example a NPN transistor, is connected to junction 156 via a resistor 158. Capacitor 174 is connected serially between the base and collector of transistor 160. The collector of transistor 160 is further connected to junction through resistor 166 and is connected directly to the base of transistor 162. The emitter of transistor 160 is connected to a junction 178 of resistors 170 and 172. The collector of transistor 162, for example a PNP transistor, is connected to the collector of transistor 164 and to junction 78 via capacitor 176. The emitter of transistor 162 is connected to a junction 180 of resistors 140 and 166 through resistor 168. The emitter of transistor 162 is connected also to the base of transistor 164, for example a PNP transistor. The emitter of transistor 164 is connected directly to junction 180 and the collector of transistor 164 is connected to junction 178 through resistor 170. Resistor 172 is serially connected between junction 178 and ground. Capacitors 174 and 176 are used for high frequency stabilization of feedback amplifier 116. Amplifier network 116 is connected to current limiting circuit 118.

Current limiting circuit 118 comprises a transistor 182, and resistors 184, 186, and 188. The collector of transistor 182, for example a NPN transistor, is connected directly to the base of transistor 160. The emitter of transistor 182 is connected to ground and the base of transistor 182 is connected to junction 190 of one side of resistors 184 and 186. The other sides of resistors 184 and 186 are connected to ground and a junction 192, respectively. Resistor 188 is serially connected between junction 192 and the ground. The output voltage from power source 110 is obtained at output terminals 194 and 196, terminal 194 being connected to the collector of transistor 164 and terminal 96 being connected to junction 192. For load compensation, junction 192 is connected to junction 153 via a line 97.

In operation of power supply 110, a low voltage AC signal, for example, is applied to a pair of input terminals 198 and 200 which are further connected to junctions 128 and 130, respectively. A full wave rectified DC voltage generated by rectifying network 112 is applied to negative feedback amplifier 116. A control voltage which determines the voltage at output terminal 194 and 196 is governed by the setting of wiper arm 152 of potentiometer 146. That is, the position of wiper arm 152 determines the voltage applied to the base of transistor 160, zener diode 138 supplying a stable voltage for potentiometer 146. Resistor 142 limits the maximum voltage level at the full position of potentiometer 146. The control voltage as at junction 154 is applied to the base of transistor 160 through resistors 144 and 158. A pulse voltage having peak amplitude somewhat less than the dead band voltage threshold of transistor 160 is superposed on the control voltage at junction 156. The dead band voltage threshold is defined as the voltage threshold between the base and emitter of transistor 160 which must be overcome before the transistor will conduct. By way of example, the dead band voltage threshold for transistors 160, 162, and 164, for example silcon transistors, is in the approximate range 0.6 to 0.8 volts. The pulses at junction 156 are generated by differentiating the half wave rectified AC signal at junction 128 in capacitor 148. Preferably, capacitor 150 has at least five times the capacitance value of capacitor 148. That is, capacitor 150 provides a low impedance AC ground for resistor 142 so that differentiation will take place and pulses will be formed. It is to be understood that, in alternative embodiments, the pulses are formed by means other than differentiation, for example, pulses are formed by dividing the half wave rectified signal at junction 128 and feeding the divided signal directly to junction 156. The values of capacitor 148 and resistor 142 are such that the peak pulse amplitude is less than the voltage gap of transistor 160. In order to smooth the pulse waveform, a resistor (not shown) may be added between junction 128 and capacitor 148. The pulse amplitude output voltage is the pulse height at the base of transistor 160 times the gain of amplifier network 16. The time constant of resistor 142, potentiometer 146, and capacitor 148 can be made much smaller than the time constant of the motor which is to be driven by power source 110, whereby no delay is introduced. Alternatively, the time constant of power source 110 can be made large with respect to the time constant of the motor so as to provide gradual acceleration and deceleration.

As previously indicated, the peak amplitude of the pulses superimposed on the control voltage is somewhat less than the voltage threshold of transistor 160. As wiper arm 152 is rotated away from ground, the pulse tips cause transistor 160 to conduct. When transistor 160 conducts, the voltage at the base of transistor 162 decreases whereby transistor 162 is brought into the conducting state. Similarly, when transistor 62 conducts, the voltage at the base of transistor 164 decreases and transistor 164 is brought into the conducting state.

Current limiting is provided by sampling the output current through resistor 188. When the voltage at the base of transistor 182, causes by the high IR drop across resistor 188, is sufficient to cause conduction of transistor 182, the base of transistor 160 is clamped. In consequence the maximum output current of source 110 is limited.

Power source 110 includes a compensating network 199 for increasing the output voltage when the output current increases. Load compensation is provided by sensing the output current through resistor 188. The sensed current is applied to the base of transistor 160 through potentiometer 146 and capacitor 150 via line 197. The sensed current causes the signal at junction 156 to vary in the same sense. In other words, load compensation is provided by positive feedback.

Load compensation with peak current limiting reduces the voltage at the output of source 110 after a short circuit across terminals 194 and 196 is removed. This is most apparent when a significant acceleration time constant is provided, i.e., the capacitance of capacitor 150 is large. Under a short circuit condition, the voltage drop across resistor 188 is approximately the same magnitude as the voltage which is required at the base of transistor 160 in order to energize amplifier 116 into a conduction state. In other words, the voltage across capacitor 150 is small. It will be noted that the clamped base of transistor 160 is isolated from potentiometer 146 and capacitor 150 via resistors 144 and 158. The magnitude of the voltage at the wiper arm 146 of potentiometer 146 is approximately the same magnitude as the voltage necessary to energize amplifier 116 into a conducting state. When the short circuit condition is removed, the voltage at junction 153 and hence the voltage at wiper arm 152 suddenly drops, whereby amplifier 116 is momentarily turned off regardless of its state prior to the short circuit condition.

Figure 6:
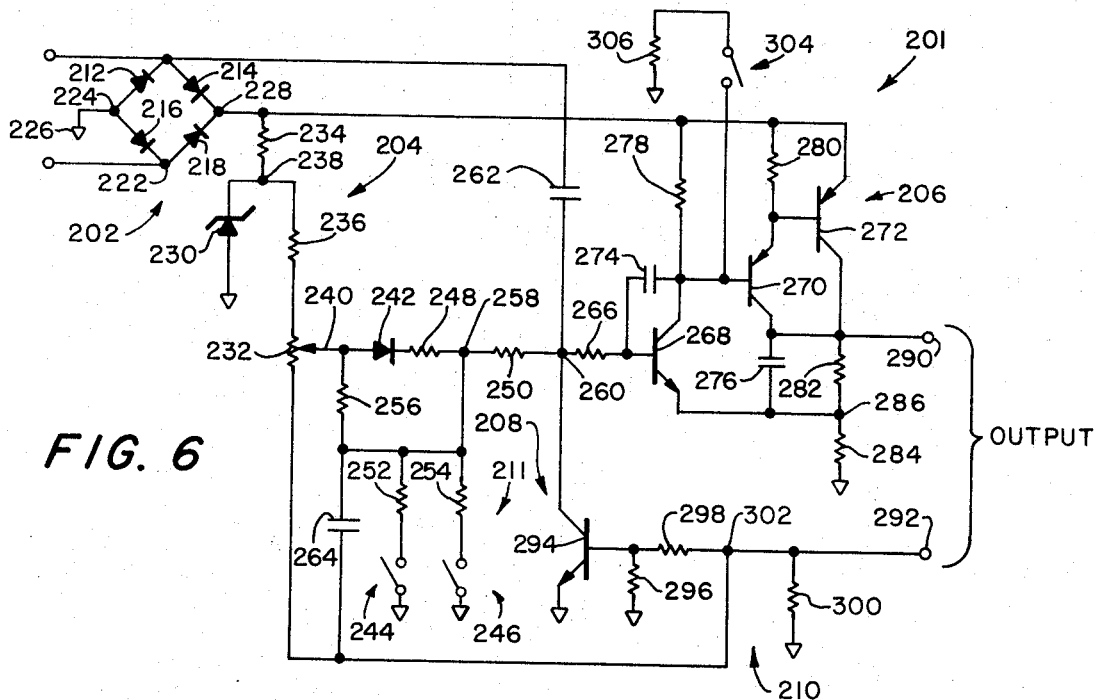
FIG. 6 is a detailed schematic diagram of FIG. 5 including a braking network.

When the power source is used for control of model railroad engines, it is desirable to provide, in addition to peak current limiting and load compensation, variable braking such as shown in FIG. 6.

Referring now to FIG. 6, it will be seen that a power source 201 comprises a full wave rectifying network 202, a control circuit 204, a negative feedback amplifier network 206, a current limiting network 208, a load compensating network 210, and a braking network 211. Full wave rectifier network 202 comprises diodes 212, 214, 216, and 218. The cathode of diode 212 and the anode of diode 214 are joined at a junction 220. The cathode of diode 216 and the anode of diode 218 are connected together at a junction 222. The anodes of diodes 212 and 216 are connected together at a junction 224 which is further connected to a ground 226. The anodes of diodes 214 and 218 are connected to a junction 228 which is further connected to control network 204.

Control network 204 comprises a zener diode 230, a variable impedance 232, and resistors 234 and 236. Junction 228 is connected to the cathode of diode 230 through resistor 234. The anode of diode 230 is connected to ground. One side of variable impedance 232, for example a potentiometer, is connected to a junction 238 of the anode of diode 230 and resistor 234 through resistor 236. The other side of potentiometer 232 is connected to current limiting network 208. A wiper arm 240 of potentiometer 232 is connected to the anode of a diode 242 which is further connected to one side of resistor 156. The cathode of diode 242 is connected to a junction 258 through a resistor 248. Junction 258 is further connected to one side of resistors 250, 252 and 254, and the other side of a resistor 256. The other sides of resistors 252 and 254 are connected to ground through switches 244 and 246, respectively. Resistor 250 is serially connected between a junction 260 and junction 258. Junction 220 is connected to junction 260 through a capacitor 262. A capacitor 264 is serially connected between the junction of resistors 252 and 256 and the junction of potentiometer 232 and current limiting network 208. Junction 260 is connected to amplifier network 206 through a resistor 266.

Amplifier 206 comprises semiconductors 268, 270, and 272; capacitors 274 and 276; and resistors 278, 280, 282 and 284. Resistor 266 is connected to the base of semiconductor 268, for example a NPN transistor. Capacitor 274, which is provided for high frequency stability, is serially connected between the base and collector transistor 268. The collector of transistor 268 is further connected to junction 228 through resistor 278. The emitter of transistor 268 is connected to a junction 286 of resistors 282 and 284. The collector of transistor 268 is connected to the base of semiconductor 270, for example a PNP transistor. The collector of transistor 270 is connected to junction 286 through capacitor 276 and is connected directly to a junction 288 at the free end of resistor 282. Capacitor 276 is provided for high frequency stabilization. The emitter of transistor 270 is connected to junction 228 through resistor 280 and is connected directly to the base of semiconductor 272, for example a PNP transistor. The emitter of transistor 272 is connected to the junction of 278 and the collector of transistor 272 is connected directly to junction 288. Junction 288 is further connected to a terminal 290. The voltage at the output of source 201 is presented between terminal 290 and a terminal 292.

Current limiting circuit 208 comprises a semiconductor 294, and resistors 296, 298, and 300. One side of resistors 298 and 300 are joined at a junction 302 which is further connected to terminal 292 and the junction of capacitor 264 and potentiometer 232. The other side of resistors 298 and 300 are connected to the base of semiconductor 294 and ground, respectively. The emitter of semiconductor 294, for example a NPN transistor is connected to ground. The base of transistor 294 is connected to ground through resistor 296. The collector of transistor 294 is connected to the base of transistor 268 through resistor 266.

The operation of source 201 is similar to the operation of source 110 as herein described with the exception of the addition of braking network 211. Braking is provided by slowly discharging capacitor 264 through resistors 252 and 254 via switches 244 and 246, respectively. Preferably, resistors 252 and 254 are different ohmic values in order to provide light or heavy braking. An anti-stall provision is provided by grounding the base of transistor 270 through a momentary contact switch 304 and resistor 306 in order to overcome high resistance dirty track stalling.

From the foregoing description it will be realized that the present invention provides a power source which permits starting of fractional horse power DC motors on narrow pulses and running on full wave rectified DC. Accordingly, low speed operation of fractional horse power motors is enhanced by pulse DC signals which better overcome the rather substantially brush and bearing friction.

Since certain changes may be made in the foregoing disclosure, without departing from the scope of the invention herein involved, it is intended that all matter contained in the above description and depicted in the accompanying drawings be construed in an illustrative and not in a limiting sense.

What is claimed is:

1. A variable power source for controlling a D. C. motor said source comprising:
    a. first means for generating a control voltage variable between a minimum level and a maximum level;
    b. second means for generating a series of constant amplitude pulses;
    c. third means operatively connected to said first and second means for summing said control voltage and said constant amplitude pulses, said constant amplitude pulses being superimposed on said control voltage and defining a combined signal, said combined signal at a first value when said control voltage is at its minimum level, said combined signal at a second value when said control voltage is at an intermediate level, said combined signal at a third level when said control voltage is at its maximum level; and
    d. driver means having input and output terminal means, said input terminal means operatively connected to said third means, said combined signal applied to said input terminal means, said output terminal means adapted for interconnection with said D. C. motor, said driver means having non-conducting and conducting states, said driver means in said non-conducting state when said combined signal applied to said input terminal means is at said first value, said driver means in said conducting state and a pulsed drive signal presented at said output terminal means for controlling said D. C. motor when said combined signal applied to said input terminal means is at said second value, said driver means in said conducting state and a continuous drive signal presented at said output terminal means for controlling said D.C. motor when said combined signal applied to said input terminal means is at said third value, said driver means including
    e. threshold means operatively connected to said third means for establishing a threshold level, the amplitude of said pulses being at a level which is smaller than said threshold level; and
    f. amplifier means having input and output terminal means, said amplifier means input terminal means operatively connected to said threshold means, said combined signal applied to said amplifier means input terminal means via said threshold means, said amplifier means output terminal means adapted for interconnection with said D. C. motor, said pulsed signal presented at said amplifier means output terminal means when said combined signal applied to said threshold means is at said second value, said continuous drive signal presented at said amplifier means output terminal means when said combined signal applied to said threshold means is at said third value.

2. A variable power source for generating a drive signal for controlling a DC motor, said source comprising:

a. rectifying means;
b. control means operatively connected to said rectifying means for generating a variable control voltage variable between a minimum level and a maximum level;
c. generator means operatively connected to said rectifying means for generating a series of fixed amplitude pulses;
d. summing means operatively connected to said control means and said generating means for summing said control voltage and pulses, said pulses being superimposed on said control voltage and defining a combined signal, said combined signal at a first value when said control voltage is at its minimum level, said combined signal at a second value when said control voltage is at an intermediate level, said combined signal at a third value when said control voltage is at its maximum level;
e. threshold means operatively connected to said summing means, said threshold means establishing a threshold level, said combined signal at said first value being less than said threshold level, said combined signal at said second and third levels being greater than said threshold level; and
f. amplifier means having input and output terminal means, said input terminal means operatively connected to said threshold means, said output terminal means adapted for interconnection with the motor, said amplifier means having conducting and non-conducting states, said amplifier means being in the non-conducting state when said combined signal applied to said threshold means is at said first value, said amplifier means being in said conducting state and pulsed driving signals being presented at said output terminal means when said combined signal applied to said threshold means is at said second value, said amplifier means being in said conducting state and continuous drive signals being presented at said output terminal means when said combined signal applied to said threshold means is at said third value.

3. The variable power source as claimed in claim 3 including current limiter means operatively connected to said input terminal means for clamping said amplifier means when a short circuit is presented at said output terminal means.

4. The variable power source claimed in claim 3 wherein said control means includes:
a. variable impedance means operatively connected between said rectifying means and said summing means for controlling the level of said control voltage; and
b. means operatively connected to said rectifying means and variable impedance means for providing a stable voltage to said variable impedance means.

5. The variable power source as claimed in claim 4 wherein said variable impedance means is a potentiometer.

6. The variable DC power source as claimed in claim 3 wherein said generator means includes differentiating means operatively connected between said rectifying means and said summing means, a half wave rectified signal generated by said rectifying means being differentiated into pulses.

7. The variable DC power sources as claimed in claim 6 wherein said differentiating means is a capacitor, said capacitor being AC coupled to ground.

8. The variable DC power sources as claimed in claim 3 wherein said amplifier means includes:
a. first transistor means having base means, collector means, and emitter means, said control voltage having pulses superimposed thereon being applied to said base means of said first transistor;
b. second transistor means having base means, collector means, and emitter means, said collector means of said first transistor means connected to said base means of said second transistor means; and
c. third transistor means having base means, collector means, and emitter means, said base of said third transistor means connected to said emitter means of said second transistor means;
d. said collector means of said first transistor means resistively connected to said rectifier means, said emitter means of said second transistor means resistively connected to said rectifier means, and said emitter means of said third transistor means connected directly to said rectifier means, said amplifier means defining negative feedback amplifier means.

9. A variable DC power source for generating a signal for controlling a fractional horse power DC motor, said source comprising:
a. rectifying means;
b. control means operatively connected to said rectifying means for generating a control voltage variable between a minimum level and a maximum level;
c. generator means operatively connected to said rectifying means for generating a series of fixed amplitude pulses, said pulses superimposed on said control voltage;
d. threshold means for establishing a threshold level, said threshold means operatively connected to said control means, said threshold level being greater than the amplitude of said pulses, said control voltage having said pulses superimposed thereon applied to said threshold means;
e. amplifier means operatively connected to said threshold means for generating drive signals, said amplifier means having input and output terminal means, said control voltage having said pulses superimposed thereon being applied to said input terminal means via said threshold means, said drive signals controlling the fractional horse power DC motor, said drive signals presented at said output terminal means when the level of said control voltage havin said pulses superimposed thereon exceeds said threshold level, said drive signals being pulsed signals when said control voltage is at an intermediate level, said drive signals being continuous signals when said control voltage is at its maximum level;
f. load compensating means operatively connected to said input terminal means for controlling the amplitude of said drive signals as a function of output current; and
g. current limiting means defining positive feedback means operatively connected between said amplifier means output terminal means and said control means, said current limiting means operating to reduce said drive signals at said output terminal means when the load current exceeds a preset level.

10. The variable DC power source as claimed in claim 10 wherein said generator means includes a first capacitor operatively connected to said rectifier means, control means, and amplifier means, said first capacitor operating to differentiate a half wave rectified signal generated by said rectifier means into a series of fixed amplitude pulses.

11. The variable DC power source as claimed in claim 10 wherein said first capacitor is AC coupled to ground via a second capacitor, said second capacitor operating to ensure that said half wave rectifier AC signal generated by said rectifying means is differentiated and pulses are formed, said pulses being superimposed on said control voltage, said second capacitor having approximately five times the capacitance of said first capacitor.

12. The variable DC power source as claimed in claim 11, including switch means, said second capacitor resistively connected to ground through said switch means, said second capacitor being discharged through said switch means to ground when said switch means is energized, the discharging of said second capacitor operating as a braking signal.

13. The variable DC power sources claimed in claim 12 wherein said amplifier means includes:
  a. first transistor means having base means, collector means, and emitter means, said control voltage having pulses superimposed thereon being applied to said base means of said first transistor;
  b. a third capacitor serially connected between said base and collector means of said first transistor means for high frequency stabilization of said amplifier means;
  c. second transistor means having base means, collector means, and emitter means, said collector means of said first transistor means connected to said base means of said second transistor means; and
  d. third transistor means having base means, collector means, and emitter means, said base means of said third transistor means connected to said emitter means of said second transistor means;
  e. said collector means of said first and second transistor means resistively connected to said rectifier means, said emitter means of said third transistor means connected directly to said rectifier means, said amplifier means defining negative feedback amplifier means.

* * * * *